United States Patent
Spitzley

(10) Patent No.: US 11,071,406 B2
(45) Date of Patent: Jul. 27, 2021

(54) COMMERCIAL FRENCH PRESS COFFEE BREWING AND DISPENSING SYSTEM

(71) Applicant: Julie K. Spitzley, Huron, OH (US)

(72) Inventor: Julie K. Spitzley, Huron, OH (US)

( * ) Notice: Subject to any disclaimer, the term of this patent is extended or adjusted under 35 U.S.C. 154(b) by 337 days.

(21) Appl. No.: 16/122,092

(22) Filed: Sep. 5, 2018

(65) Prior Publication Data

US 2019/0069711 A1 Mar. 7, 2019

Related U.S. Application Data

(60) Provisional application No. 62/554,241, filed on Sep. 5, 2017.

(51) Int. Cl.
*A47J 31/38* (2006.01)
*A47J 31/06* (2006.01)
(Continued)

(52) U.S. Cl.
CPC ............ *A47J 31/38* (2013.01); *A47J 31/0663* (2013.01); *A47J 31/0684* (2013.01);
(Continued)

(58) Field of Classification Search
CPC ........ A47J 31/20; A47J 31/0663; A47J 31/42; A47J 31/446; A47J 2031/0694;
(Continued)

(56) References Cited

U.S. PATENT DOCUMENTS 2,529,395 A * 11/1950 Hummel ............... G01F 11/021
99/302 P
3,901,440 A * 8/1975 Baker ....................... E03B 9/20
239/28
(Continued)

FOREIGN PATENT DOCUMENTS

WO WO 00/27261 A1 5/2000

OTHER PUBLICATIONS

Facebook Post: "Our Project Hits Reality!" Storm Mountain Coffee, posted Apr. 5, 2017, at https://www.facebook.com/drinksstorm/photos/a.285840971535885/1259752840811352/?type=3&theater, 1 pg.
(Continued)

*Primary Examiner* — Tu B Hoang
*Assistant Examiner* — Vy T Nguyen

(57) ABSTRACT

A first coffee brewing and dispensing system that includes a removable grounds chamber assembly that includes a basin for holding ground coffee, an extendable dispensing spout, and a valve mechanism for opening and closing the dispensing spout; a brewing chamber assembly positioned on top of the removable grounds chamber assembly; and a lid/plunger assembly adapted to be inserted into the brewing chamber and removable grounds chamber, wherein the lid/plunger assembly includes a press rod, a handle mounted on the press rod, wherein the handle includes a trigger mounted therein, a lid mounted on the press rod below the handle, a wiper assembly mounted on the press rod below the lid; and a filter assembly mounted on the press rod below the wiper assembly, wherein the wiper assembly may be moved independently of the filter assembly by actuating the trigger in the handle.

15 Claims, 11 Drawing Sheets

(51) Int. Cl.
   *A47J 31/46*    (2006.01)
   *A47J 31/44*    (2006.01)
   *A47J 31/36*    (2006.01)

(52) U.S. Cl.
   CPC ......... *A47J 31/3671* (2013.01); *A47J 31/446* (2013.01); *A47J 31/461* (2018.08); *A47J 31/468* (2018.08)

(58) Field of Classification Search
   CPC ........ A47J 31/005; A47J 31/02; A47J 31/043; A47J 31/06; A47J 31/0605; A47J 31/0615; A47J 31/0626; A47J 31/0631; A47J 31/0684; A47J 31/10; A47J 31/3671; A47J 31/38; A47J 31/41; A47J 31/44; A47J 31/441; A47J 31/46; A47J 31/461; A47J 31/468; A47J 31/60; A23F 5/262
   USPC ..... 99/287, 297, 299, 279, 283, 289 R, 295, 99/298, 302 P, 302 R, 316, 318, 323; 426/431, 433, 330, 425, 432
   See application file for complete search history.

(56) References Cited

U.S. PATENT DOCUMENTS

| | | | |
|---|---|---|---|
| 5,544,566 A * | 8/1996 | Bersten | A47J 31/20 99/287 |
| 6,240,833 B1 * | 6/2001 | Sham | A47J 31/20 99/283 |
| 6,240,883 B1 | 6/2001 | Sham et al. | |
| 7,040,218 B1 | 5/2006 | Biolchini, Jr. | |
| 8,586,117 B2 * | 11/2013 | Vastardis | C12G 3/00 426/433 |
| 8,695,485 B2 | 4/2014 | Spitzley et al. | |
| 2007/0272085 A1 * | 11/2007 | Ghassemlou | A47J 31/005 99/282 |
| 2010/0294135 A1 * | 11/2010 | Weissman | A47J 31/20 99/287 |
| 2011/0014340 A1 * | 1/2011 | Spitzley | A23F 5/262 426/433 |
| 2013/0263745 A1 * | 10/2013 | Bombeck | A47J 31/24 99/293 |
| 2018/0192809 A1 * | 7/2018 | Harper | A47J 31/20 |

OTHER PUBLICATIONS

International Search Report and Written Opinion dated Nov. 20, 2018 for Application No. PCT/US2018/049536, 10 pgs.

* cited by examiner

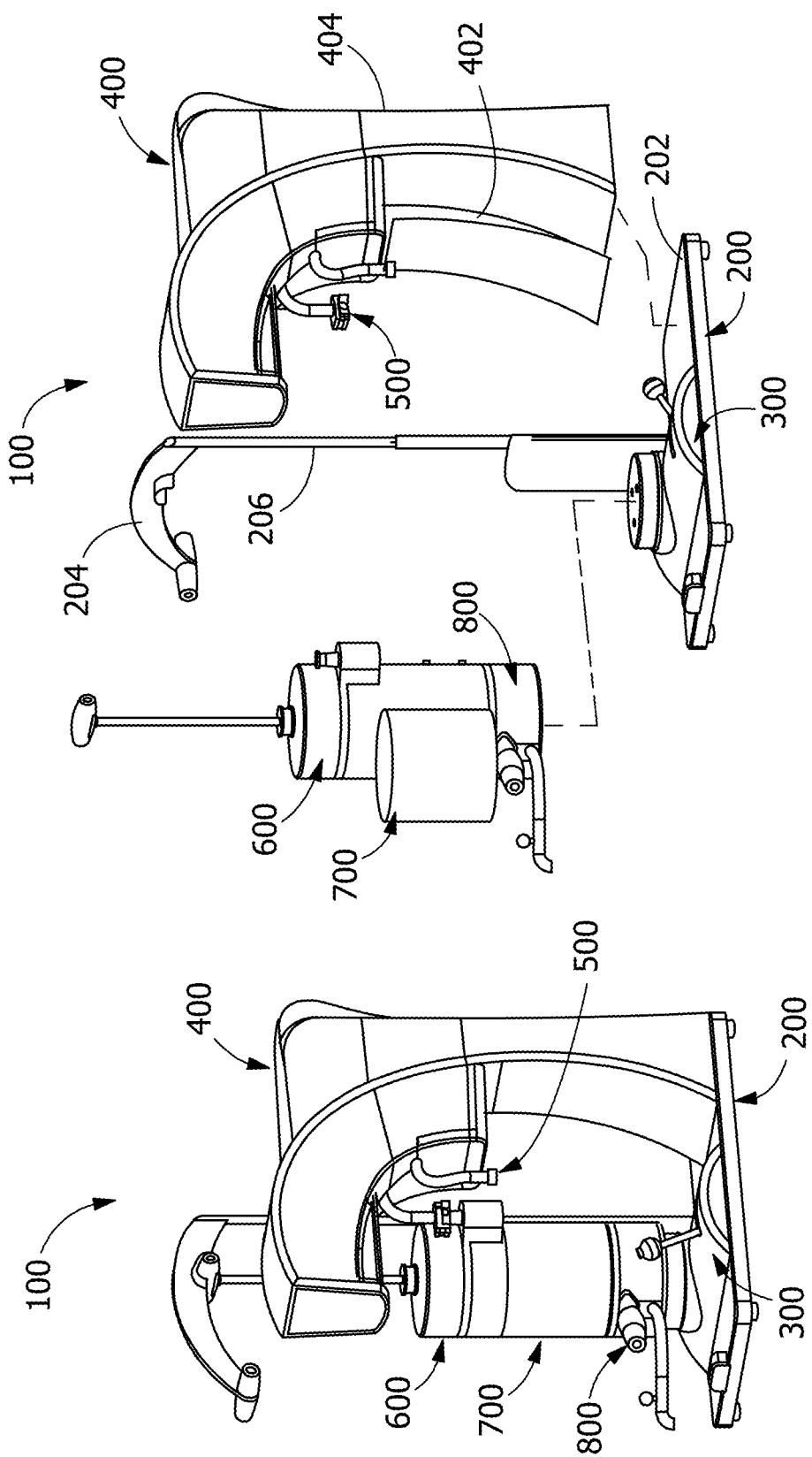

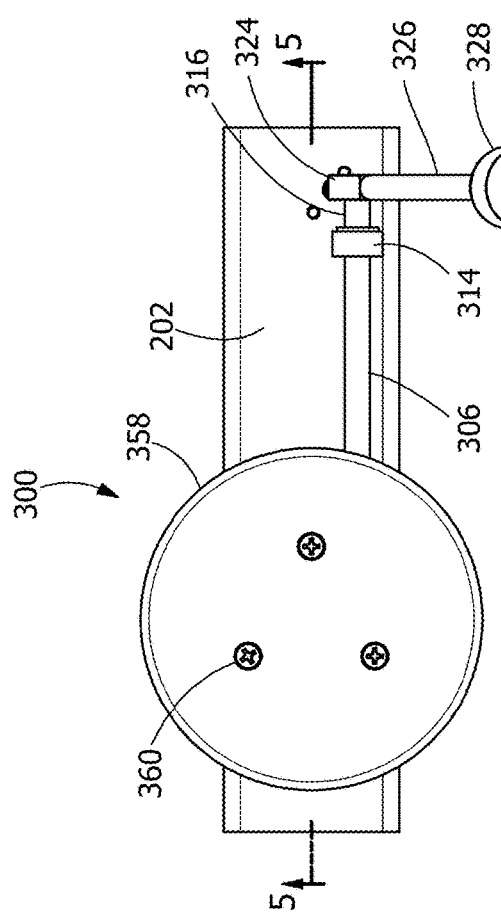
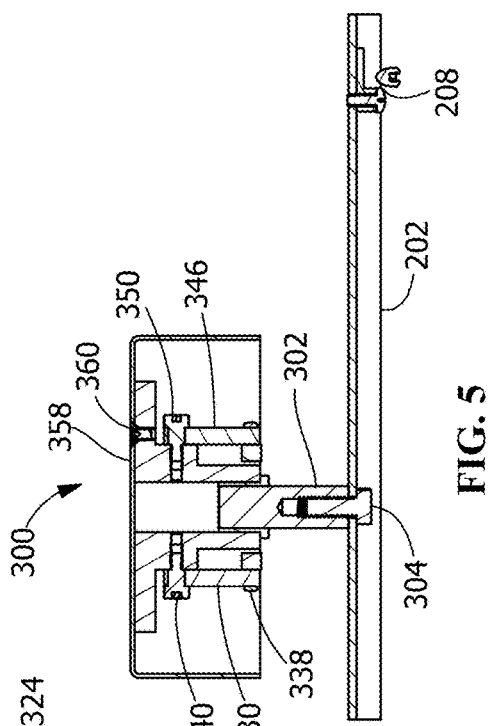
FIG. 4
FIG. 5
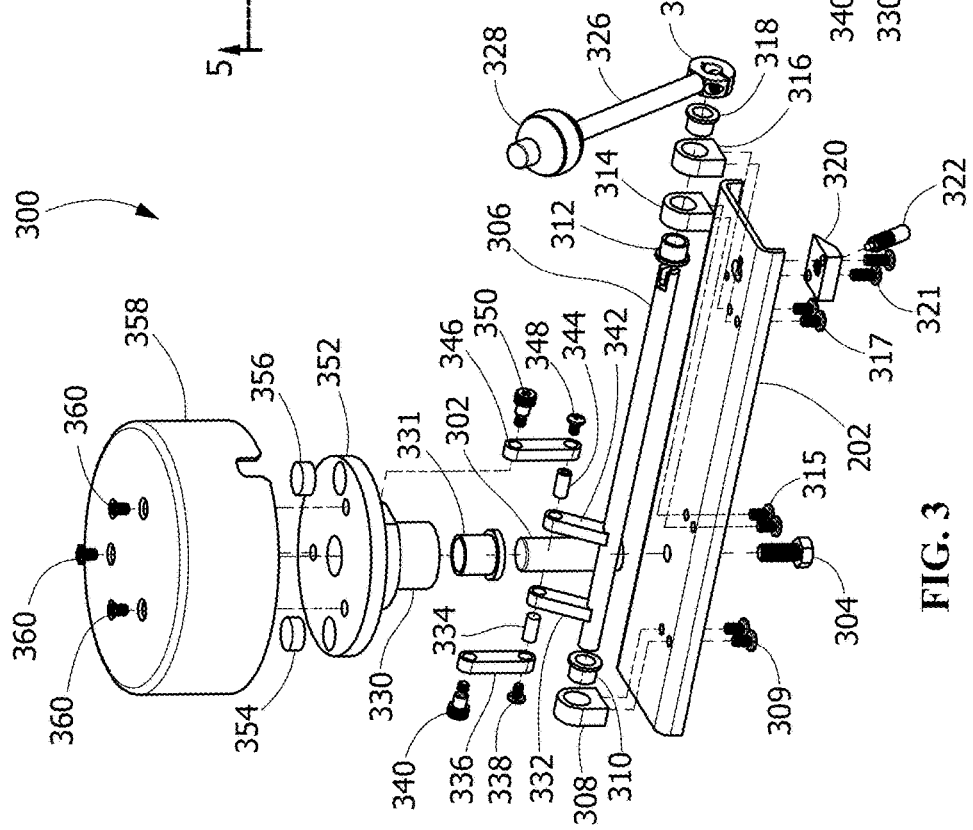
FIG. 3

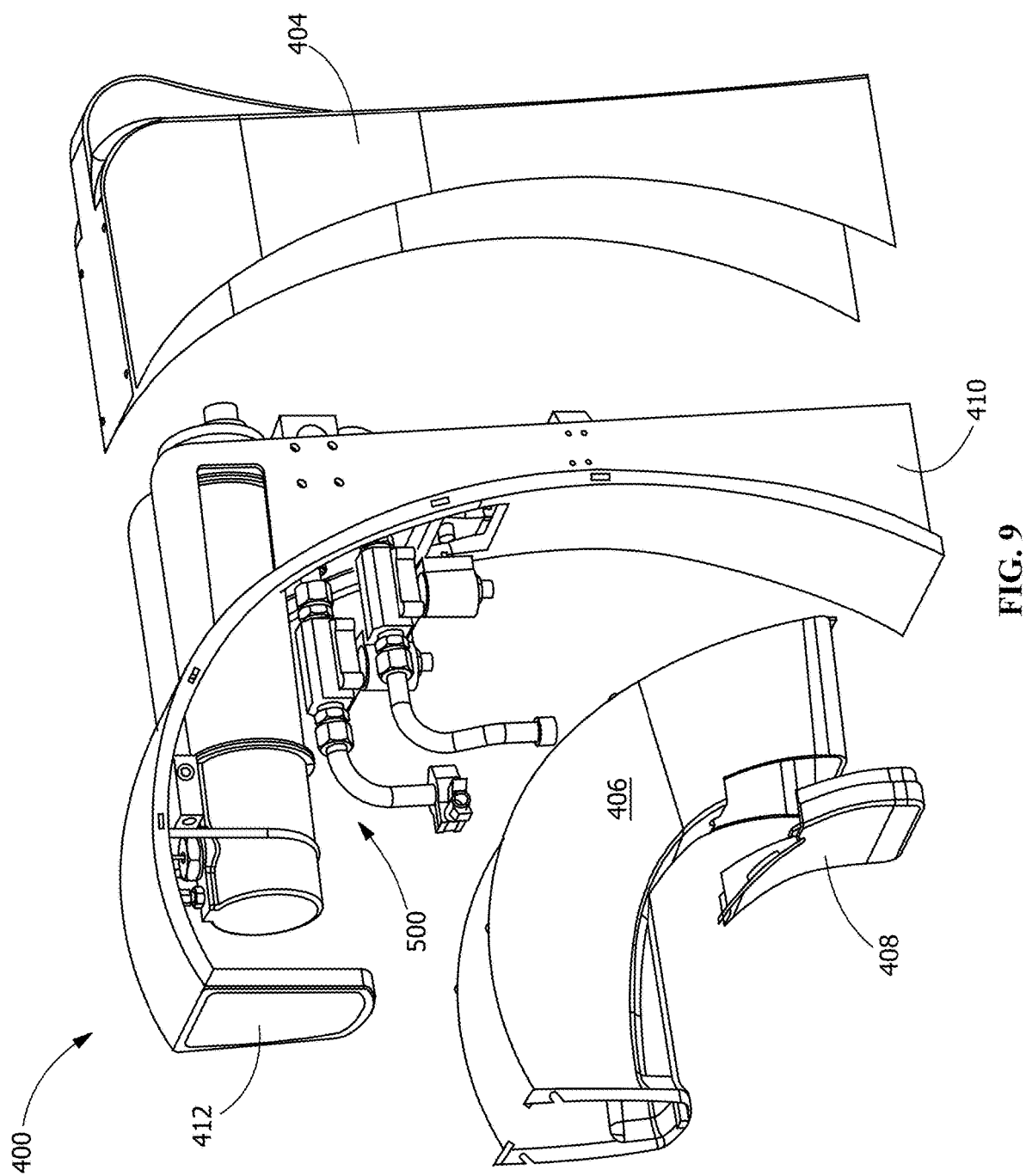

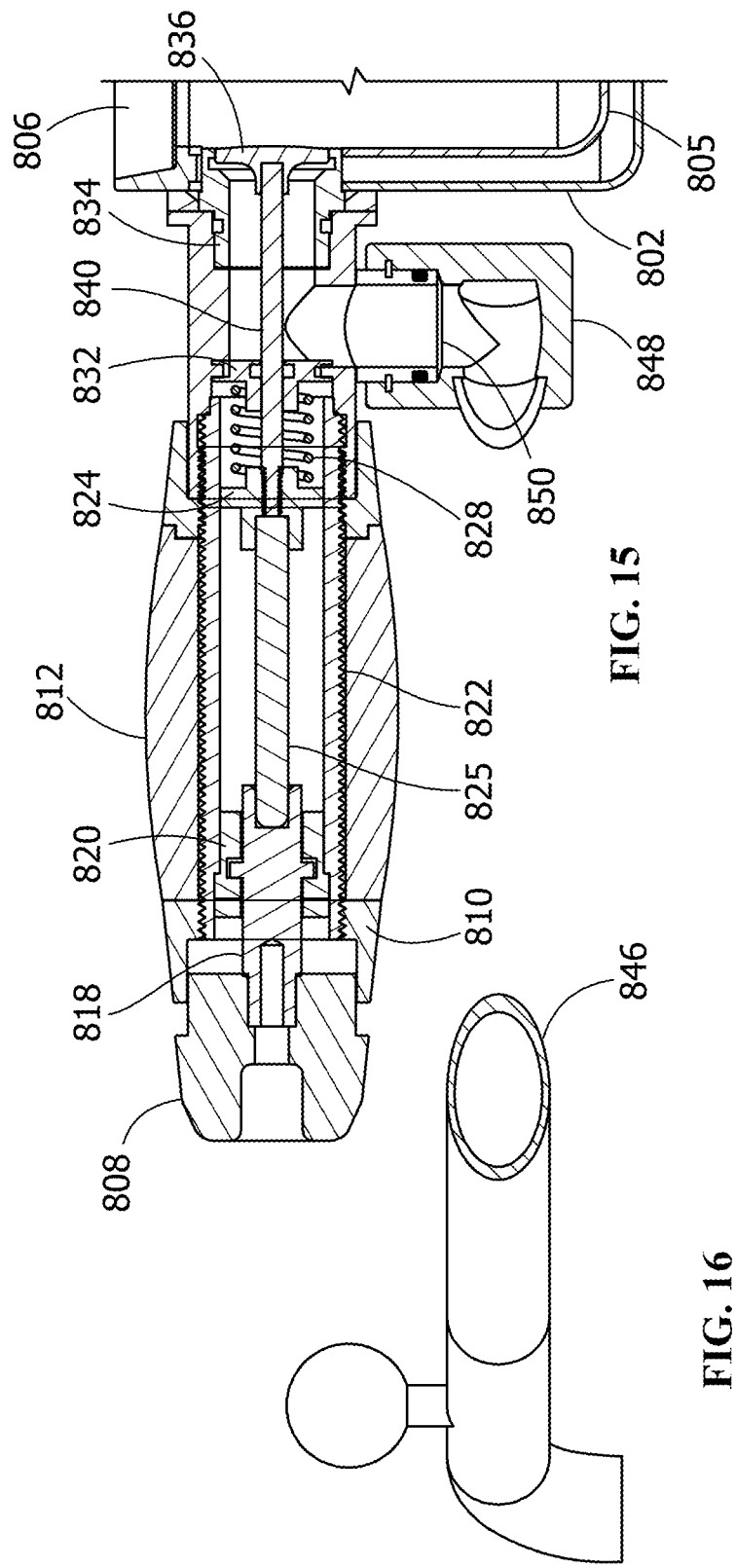

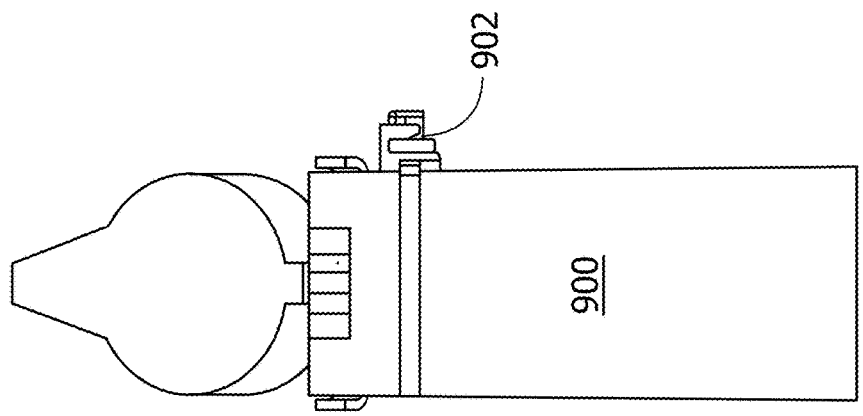
FIG. 19
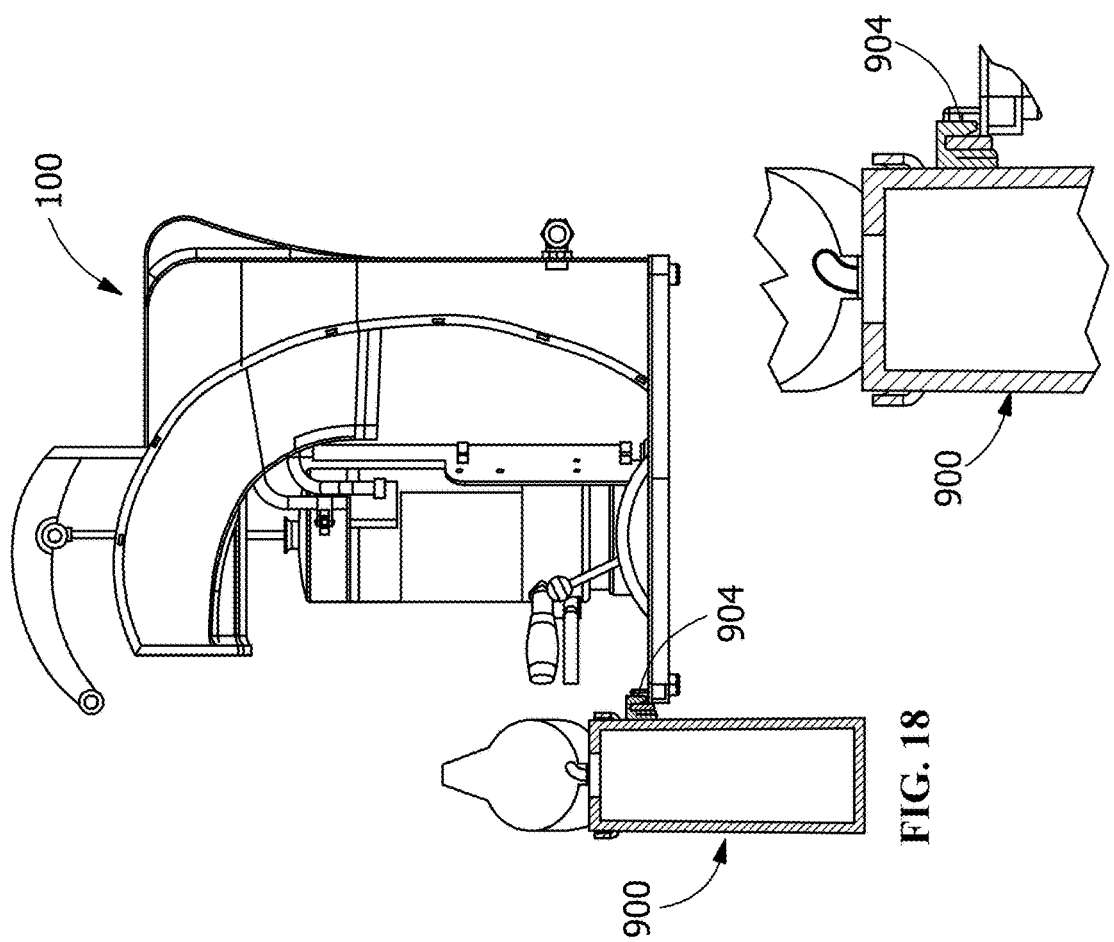
FIG. 17
FIG. 18

COMMERCIAL FRENCH PRESS COFFEE BREWING AND DISPENSING SYSTEM

CROSS-REFERENCE TO RELATED APPLICATIONS

This patent application claims the benefit of U.S. Provisional Patent Application Ser. No. 62/554,241 filed on Sep. 5, 2017 and entitled "Commercial French Press Coffee Brewing and Dispensing System," the disclosure of which is hereby incorporated by reference herein in its entirety and made part of the present U.S. utility patent application for all purposes.

BACKGROUND OF THE INVENTION

The described invention relates in general to systems and devices for making coffee or other beverages, and more specifically to a large-scale French press type coffee brewing and dispensing system for use in commercial environments.

A French press coffee maker is a fairly common, commercially available coffee brewing device that typically includes a cylindrical pot or reservoir with a plunger and built-in filter screen or mesh that presses hot water through ground coffee. A French press coffee maker tends to work best with coffee of a coarser grind than does a drip brew coffee maker; however, a medium grind of coffee with uniformity and consistency throughout is often most desirable for use with such devices. Finer grounds, when immersed in water, have lower permeability, thereby requiring excessive force to be applied by hand to lower the plunger and are more likely to seep through or around the perimeter of the press filter and into the coffee. Additionally, finer grounds tend to over-extract and impart a bitter taste to the coffee.

Using a French press, coffee is typically brewed by placing ground coffee in the empty cylindrical pot and adding hot (e.g., between 93-96° C./199-205°) water, in proportions of about 30 g of coffee grounds to about 500 ml of water, more or less to taste. After stirring the contents, the coffee is usually allowed to brew for about two to four minutes. The plunger is pressed to separate the grounds and retain them at the bottom of the cylindrical pot. The mesh screen at the end of the piston does not normally compress the coffee grounds, as most French press coffee maker designs leave about 30 mm (1.2 inches) below the piston in its lowest position. If the brewed coffee is allowed to remain in the cylindrical pot with the spent coffee grounds, the coffee may become astringent and bitter, though this is an effect that some users of the French press consider desirable. The optimum time for brewing coffee is considered to be around four minutes, and some consider the coffee ruined after about 20 minutes. Other approaches, such as cold-brewing, require several hours of contact between the water and the grounds to achieve the desired extraction. After each use, the cylindrical pot should be washed with water and a mild detergent and dried thoroughly.

Although the French press coffee maker is a somewhat common item, the devices tend to be relatively small in size and volume and are intended for making one or two cups of coffee. French press coffee makers are also somewhat difficult to clean due to their basic design and the fact that they must be cleaned after each use, in addition to their small size and volume, makes them impractical for commercial use. Accordingly, there is an ongoing need for a large French press coffee maker that can be used in commercial environments such as restaurants and coffee shops.

SUMMARY OF THE INVENTION

The following provides a summary of certain exemplary embodiments of the present invention. This summary is not an extensive overview and is not intended to identify key or critical aspects or elements of the present invention or to delineate its scope. However, it is to be understood that the use of indefinite articles in the language used to describe and claim the present invention is not intended in any way to limit the described system. Rather the use of "a" or "an" should be interpreted to mean "at least one" or "one or more".

In accordance with one aspect of the present invention, a first coffee brewing and dispensing system is provided. This coffee brewing and dispensing system includes a removable grounds chamber assembly, wherein the removable grounds chamber assembly includes a basin for holding ground coffee, an extendable dispensing spout, and a valve mechanism for opening and closing the dispensing spout; a brewing chamber assembly positioned on top of the removable grounds chamber assembly; and a plunger assembly adapted to be inserted into the brewing chamber and removable grounds chamber, wherein the plunger assembly includes a press rod, a handle mounted on the press rod, wherein the handle includes a trigger mounted therein, a lid mounted on the press rod below the handle, a wiper assembly mounted on the press rod below the lid; and a filter assembly mounted on the press rod below the wiper assembly, wherein the wiper assembly may be moved independently of the filter assembly by actuating the trigger in the handle.

In accordance with another aspect of the present invention, a second coffee brewing and dispensing system is provided. This coffee brewing and dispensing system includes a supportive frame, wherein the supportive frame includes a base plate, two side supports mounted on the base plate and a rear support mounted on the based plate; a lifting mechanism attached to the base plate of the supportive frame, wherein the lifting mechanism may be moved from a raised positioned to a lowered positioned and from the lowered position back to the raised position a removable grounds chamber assembly positioned on top of the lifting mechanism, wherein the removable grounds chamber assembly includes a basin for holding ground coffee, an extendable dispensing spout, and a valve mechanism for opening and closing the dispensing spout; a brewing chamber assembly positioned on top of the removable grounds chamber assembly and attached to the supportive frame; and a plunger assembly adapted to be inserted into the brewing chamber and removable grounds chamber, wherein the plunger assembly includes a press rod, a handle mounted on the press rod, wherein the handle includes a trigger mounted therein, a lid mounted on the press rod below the handle, a wiper assembly mounted on the press rod below the lid, and a filter assembly mounted on the press rod below the wiper assembly, wherein the wiper assembly may be moved independently of the filter assembly by actuating the trigger in the handle.

In yet another aspect of this invention, a third coffee brewing and dispensing system is provided. This coffee brewing and dispensing system includes a supportive frame, wherein the supportive frame includes a base plate, two side supports mounted on the base plate and a rear support mounted on the base plate; a lifting mechanism attached to the base plate of the supportive frame, wherein the lifting mechanism may be moved from a raised positioned to a lowered positioned and from the lowered position back to the raised position; a removable grounds chamber assembly positioned on top of the lifting mechanism, wherein the removable grounds chamber assembly includes a basin for holding ground coffee, an extendable dispensing spout, and a valve mechanism for opening and closing the dispensing spout; a brewing chamber assembly positioned on top of the removable grounds chamber assembly and attached to the supportive frame; a plunger assembly adapted to be inserted into the brewing chamber and removable grounds chamber, wherein the plunger assembly includes a press rod, a handle mounted on the press rod, wherein the handle includes a trigger mounted therein, a lid mounted on the press rod below the handle, a wiper assembly mounted on the press rod below the lid, and a filter assembly mounted on the press rod below the wiper assembly, wherein the wiper assembly may be moved independently of the filter assembly by actuating the trigger in the handle; and a source of water connected to or integrated with the brewing chamber; and a water heating system connected to or integrated with the source of water.

Additional features and aspects of the present invention will become apparent to those of ordinary skill in the art upon reading and understanding the following detailed description of the exemplary embodiments. As will be appreciated by the skilled artisan, further embodiments of the invention are possible without departing from the scope and spirit of the invention. Accordingly, the drawings and associated descriptions are to be regarded as illustrative and not restrictive in nature.

BRIEF DESCRIPTION OF THE DRAWINGS

The accompanying drawings, which are incorporated into and form a part of the specification, schematically illustrate one or more exemplary embodiments of the invention and, together with the general description given above and detailed description given below, serve to explain the principles of the invention, and wherein:

FIG. 1 is a perspective side view of a commercial French press coffee maker in accordance with an exemplary embodiment of the present invention, wherein the coffee maker is shown in an assembled state;

FIG. 2 is an exploded, side perspective view of the coffee maker of FIG. 1;

FIG. 3 is an exploded, side perspective view of the lift assembly of the coffee maker of FIG. 1;

FIG. 4 is a top view of the lift assembly of the coffee maker of FIG. 1;

FIG. 5 is a side, cross sectional view of the lift assembly of the coffee maker of FIG. 1;

FIG. 9 is an exploded, side perspective view of the upper assembly of the coffee maker of FIG. 1;

FIG. 15 is a cross-sectional side view of the handle portion of the grounds chamber assembly of the coffee maker of FIG. 1;

FIG. 16 is a cross-sectional side view of the spout portion of the grounds chamber assembly of the coffee maker of FIG. 1;

FIG. 17 is a side view of the commercial French press coffee maker of the present invention, wherein an airpot or insulated decanter is attached to the lower assembly by a connector mechanism mounted on the lower assembly of the coffee maker;

FIG. 18 is a cross-sectional front view of the airpot or insulated decanter, which is connected to the lower assembly of the coffee maker; and FIG. 19 is a front view of the airpot or insulated decanter showing the clip mechanism mounted thereon which attaches to a corresponding structure on the lower assembly of the coffee maker.

DETAILED DESCRIPTION OF THE INVENTION

Figure 6:
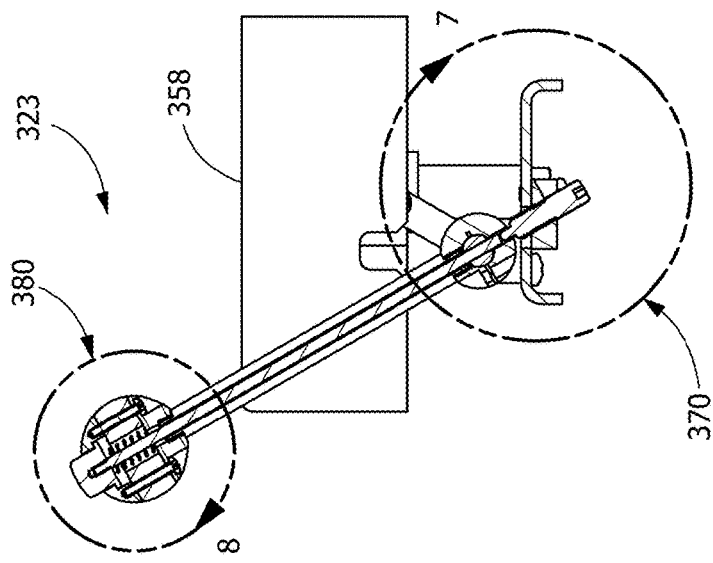
FIG. 6 is a cross-sectional side view of the lift knob assembly of the coffee maker of FIG. 1.

Exemplary embodiments of the present invention are now described with reference to the Figures. Reference numerals are used throughout the detailed description to refer to the various elements and structures. Although the following detailed description contains many specifics for the purposes of illustration, a person of ordinary skill in the art will appreciate that many variations and alterations to the following details are within the scope of the invention. Accordingly, the following embodiments of the invention are set forth without any loss of generality to, and without imposing limitations upon, the claimed invention.

With reference now to the Figures, FIGS. 1-19 provide various illustrative views of a large-scale, high-volume commercial French press coffee maker in accordance with an exemplary embodiment of the present invention. FIG. 1 provides a perspective side view of the present invention, wherein the coffee maker is shown in an assembled state, while FIG. 2 is an exploded, side perspective view of the coffee maker of FIG. 1. The basic components and assemblies of the exemplary embodiment of coffee maker 100 shown in the Figures include lower assembly 200; lift assembly 300, which is mounted on lower assembly 200; upper assembly 400, which houses heating system assembly 500; lid assembly 600; brew chamber assembly 700, which is positioned below lid assembly 600; and grounds chamber assembly 800, which is positioned below brew chamber 700.

As shown in FIG. 2, lower assembly 200; includes base 202; depressor handle 204 and depressor rod 206, which are used to depress the main handle of coffee maker 100; and clip assembly 208/904 for an airpot or similar device. FIG. 3 provides an exploded, side perspective view of the lift assembly of the coffee maker of FIG. 1; FIG. 4 provides a top view of the lift assembly of the coffee maker of FIG. 1; and FIG. 5 provides a side, cross sectional view of the lift assembly of the coffee maker of FIG. 1. With reference to these Figures, lift assembly 300, which is used to raise and lower grounds chamber assembly 800, includes lift shaft 302, which is attached to base 202 by bolt 304. Mounted on base 202 is lift rod 306, which is rotatable, and which includes first bushing block 308 (attached to based 202 with screws 309); first bushing 310; second bushing 312; second bushing block 314 (attached to base 202 with screws 315); third bushing block 316 (attached to base 202 with screws 317) and third bushing 318, which connects to lift knob assembly 323. Cooperating with lift shaft 302 is collar 331, which connects to support for lift platform 330 upon which lift platform 352 is mounted. Magnets 354 and 356 are positioned on lift platform 352 and lift plate 358 is attached to lift platform 352 by screws 360. Lift platform 352 is raised and lowered by actuating lift knob assembly 323 (which includes lever/handle 326 and knob 328), which rotates lift rod 306, which itself is connected to lift shaft 302 by a series of lift links and their respective connectors. As shown in FIG. 3, these structures include lift link 332; sleeve 334; lift link 336; bolt 338; bolt 340; lift link 342; sleeve 344; lift link 346; bolt 348; and bolt 350.

Figure 8:
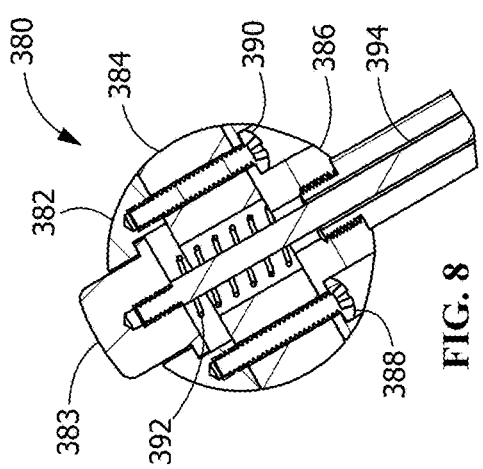
FIG. 8 is a cross-sectional side view of the upper portion of the lift knob assembly of the coffee maker of FIG. 1.
Figure 7:
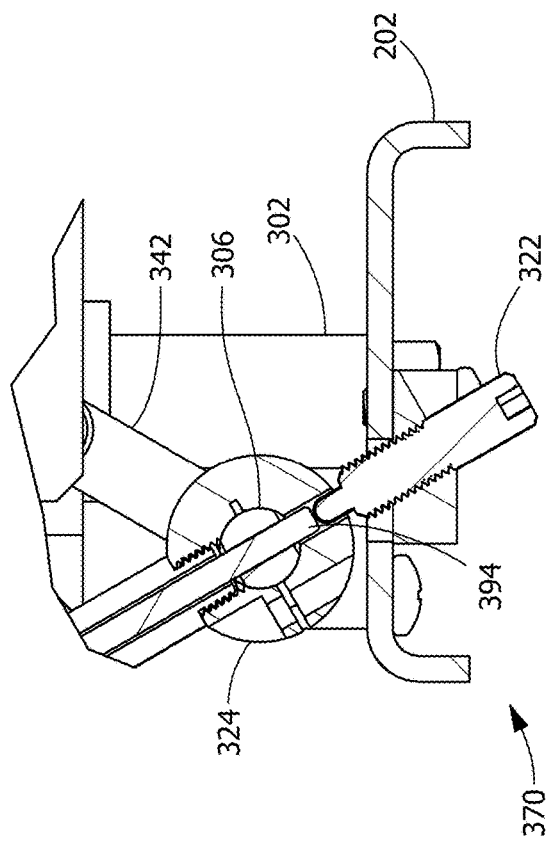
FIG. 7 is a cross-sectional side view of the bottom portion of the lift knob assembly of the coffee maker of FIG. 1.

FIG. 6 provides a cross-sectional side view of lift knob assembly 323; FIG. 7 provides a cross-sectional side view of the lower portion of the lift knob assembly 323 and FIG. 8 is a cross-sectional side view of the upper portion of the lift knob assembly 323. With regard to lower portion 370, lift knob assembly 323 is connected to base 202 using mounting block 320 (attached to base 202 with screws 321), and latch pin 322, which engages base of handle/clamping shaft collar 324. Set screw 325 is used to secure lift knob stem 394 in clamping shaft collar 324. Upper portion 380 includes lift knob top 382; lift knob button 383; lift knob middle section 384; and lift knob bottom section 386. These sections are held together by screws 388 and 390. Lift knob assembly 323 is actuated by depressing lift knob button 383, which compresses compression spring 392, and moves stem 394 downward.

Figure 10:
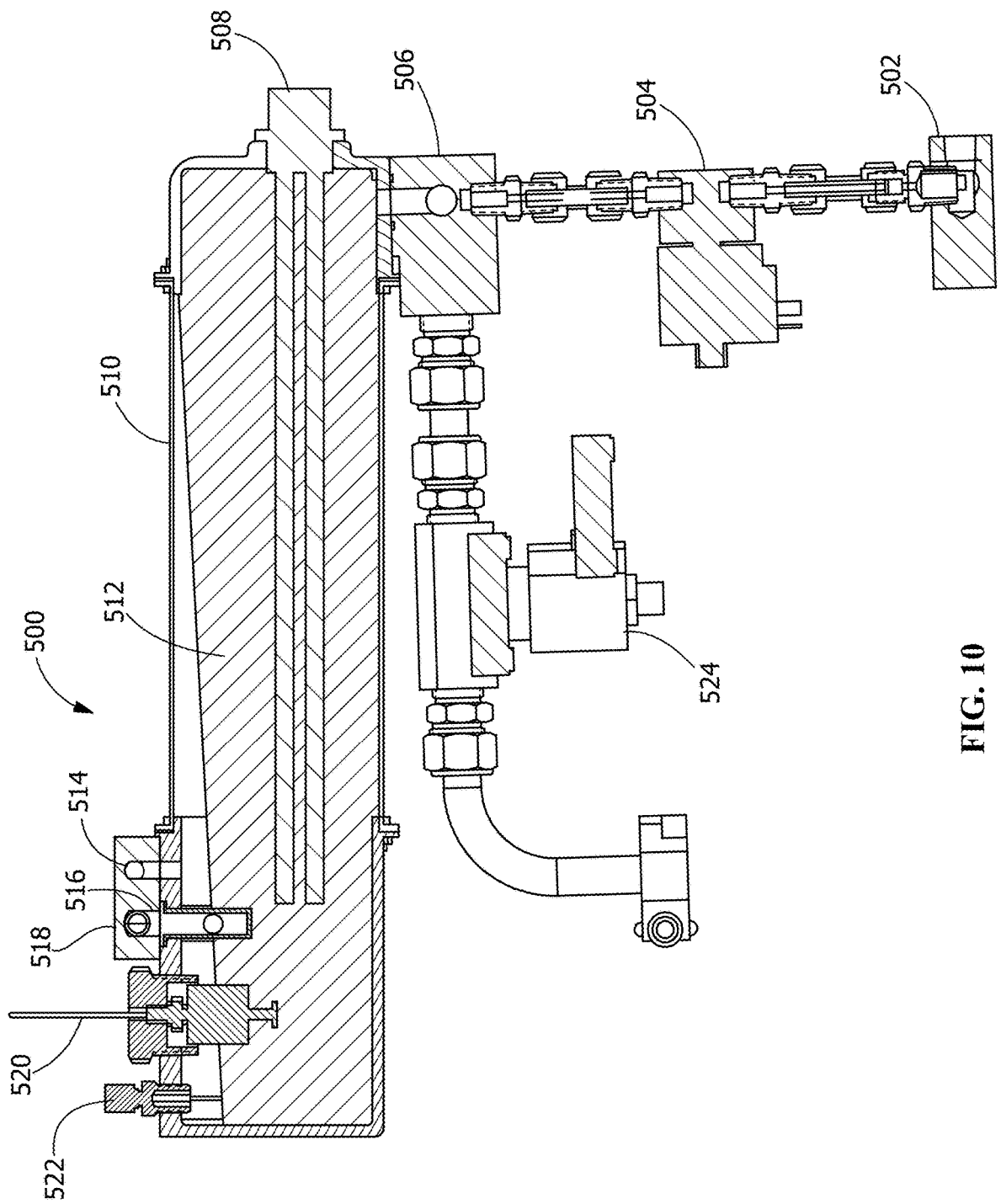
FIG. 10 is a cross-sectional side view of the water heating system of the coffee maker of FIG. 1.

FIG. 9 provides an exploded, side perspective view of the upper assembly of coffee maker 100. Upper assembly 400 includes front panel 402 (see also FIG. 2); rear housing portion 404; front housing portion 406; housing insert 408; support frame for heating system 410; and controller assembly 412. Upper assembly 400 supports and houses rapid heating system assembly 500, which is shown in FIGS. 9 and 10. Heating system assembly 500 includes water inlet manifold 502; water inlet valve 504; heater inlet/outlet manifold 506; heater element 508; tank 510; water 512; relief valve 514; vent 516; vent manifold 518; water level sensor 520; thermocouple 522; and outlet valve 524. As shown in FIG. 1, heating system assembly 500 dispenses hot water directly into the brew chamber assembly when coffee maker 100 is in use. Heating system assembly 500 rapidly heats water to a desired brewing temperature (e.g., 196-204° F.).

Figure 11:
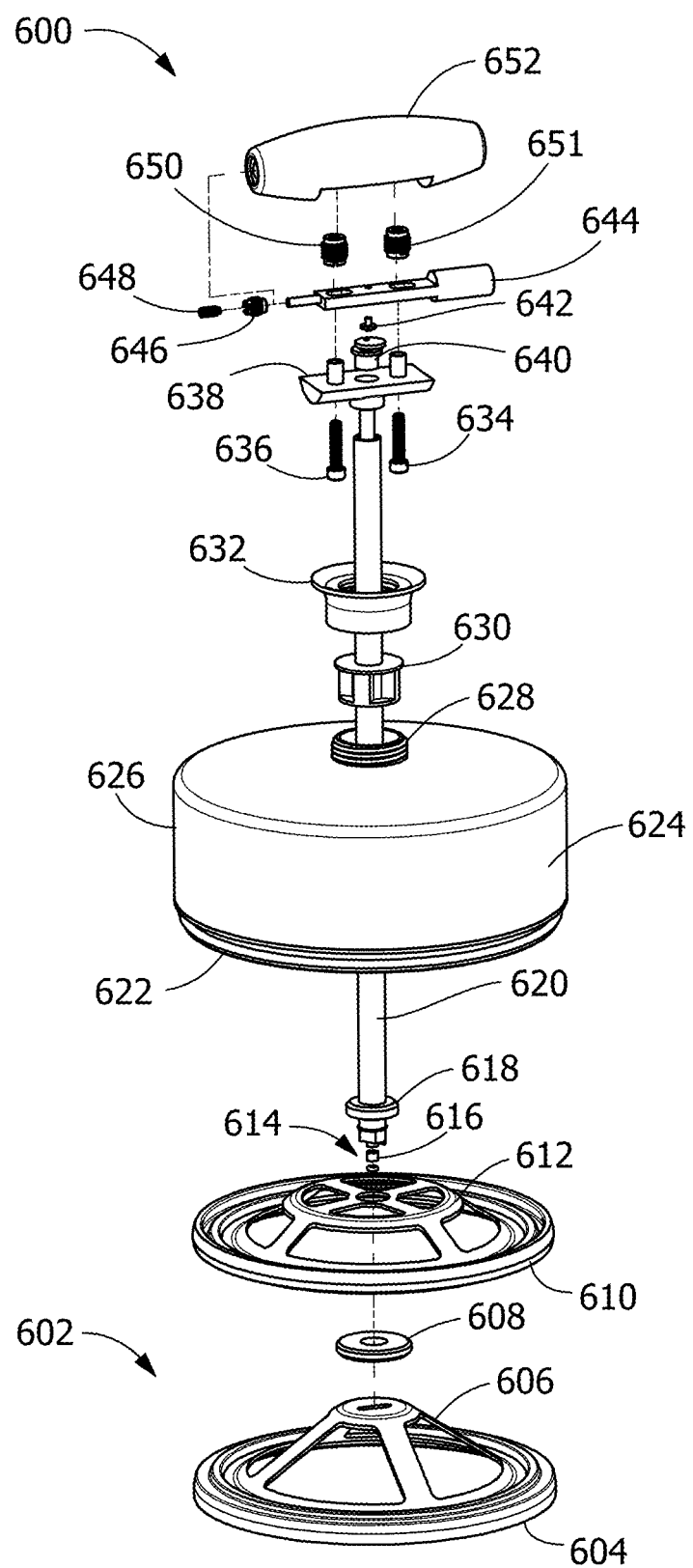
FIG. 11 is an exploded side perspective view of the lid/plunger assembly of the coffee maker of FIG. 1.
Figure 12:
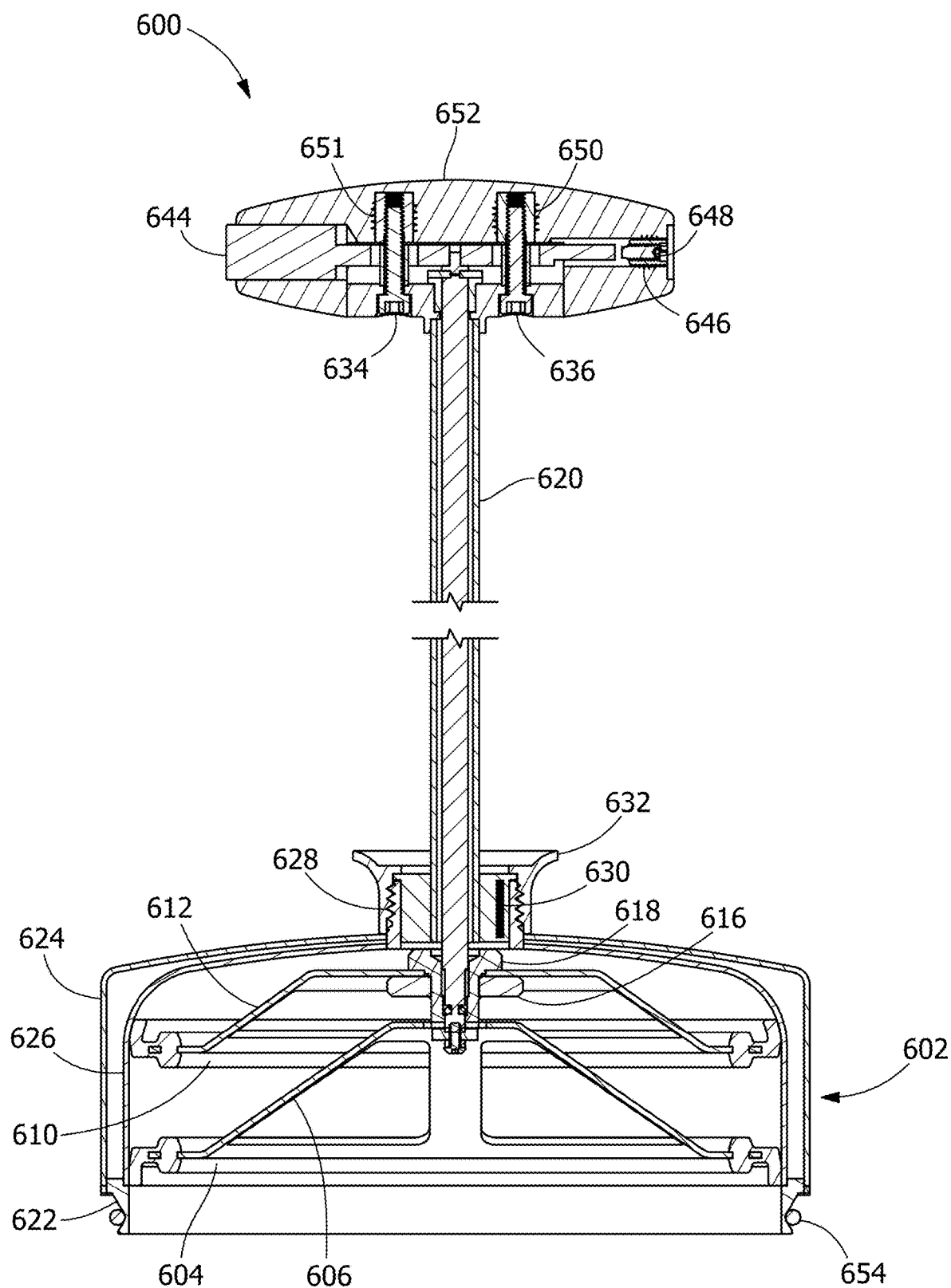
FIG. 12 is a cross-sectional side view of the lid/plunger assembly of the coffee maker of FIG. 1.

FIG. 11 provides an exploded side perspective view of the lid or plunger assembly of coffee maker 100 and FIG. 12 provides a cross-sectional side view of the lid/plunger assembly of coffee maker 100. Lid/plunger assembly 600 includes filter/wiper system 602, which further includes first wiper seal 604; wiper frame 606 within which a filter screen is mounted to create a filter assembly; wiper nut 608; second wiper seal 610 and second wiper frame 612, which cooperate to form a wiper assembly. Lid assembly 600 also includes press handle assembly 614; sleeve bearing 616; press handle end fitting 618; press handle tube 620; seal ring 622; outer lid 624; inner lid 626; lid tube 628; lid bearing 630; lid grip 632; bolt 634; bolt 636; press handle mount 638; screw spacer 640; thrust washer 642; press release button 644; housing 646; set screw 648; threaded housing 650; threaded housing 651; and press handle 652. As described below, the two wiper assemblies work together to prevent coffee grounds from bypassing the filter screen.

Figure 13:
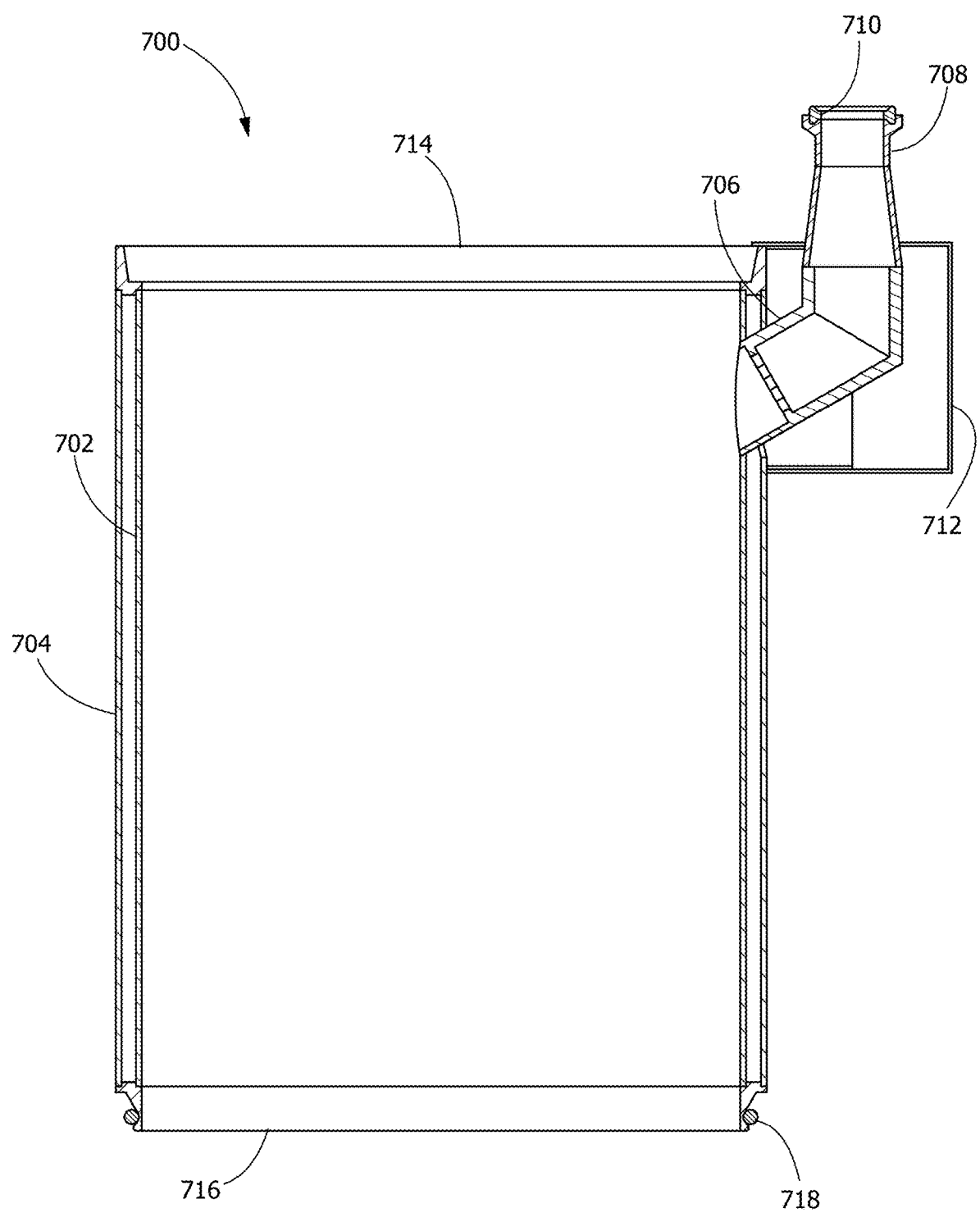
FIG. 13 is a cross-sectional side view of the brew chamber assembly of the coffee maker of FIG. 1.
Figure 14:
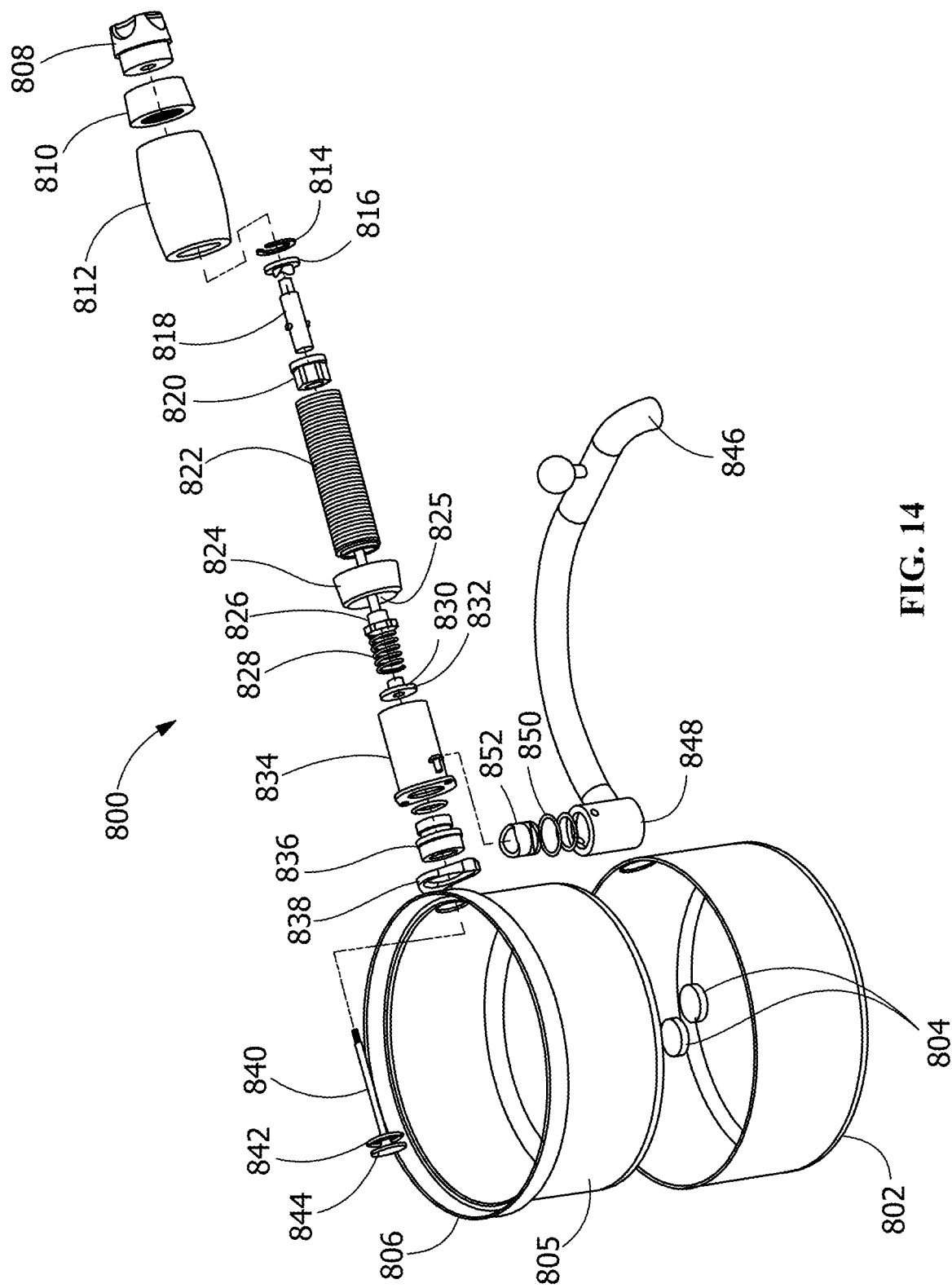
FIG. 14 is an exploded, side perspective view of the grounds chamber assembly of the coffee maker of FIG. 1.

FIG. 13 provides a cross-sectional side view of the brew chamber assembly of coffee maker 100 and FIG. 14 provides an exploded, side perspective view of the grounds chamber assembly of coffee maker 100. Brew chamber assembly 700 includes brew chamber inner wall 702; brew chamber outer wall 704; inlet tube 706; sanitary weld fitting (¾ inch) 708; sanitary gasket (¾ inch) 710; inlet cover 712; upper seal ring 714; lower seal ring 716; and O-ring 718. As described below, brew chamber assembly 700 is adapted to receive heated water directly from heating system assembly 500.

FIG. 14 provides an exploded, side perspective view of the grounds chamber assembly of coffee maker 100, which is adapted to hold ground coffee); FIG. 15 provides a cross-sectional side view of the handle portion of the grounds chamber assembly of coffee maker 100 and FIG. 16 is a cross-sectional side view of the spout portion of the grounds chamber assembly of coffee maker 100. With reference to these Figures, grounds chamber assembly 800 includes grounds chamber outer wall 802; grounds chamber target 804; grounds chamber basin inner wall 805; seal ring 806; valve knob 808; rear bezel of handle 810; grounds chamber handle 812; internal retaining ring 814; locking disc 816; valve insert 818; valve insert 820; handle base 822; front bezel of handle 824; plunger pin 825; plunger base 826; compression spring 828; O-ring 830; valve seal 832; valve body 834; valve mount 836; valve flange 838; valve stem 840; O-ring 842; valve cap 844; spout tube 846; spout fitting 848; and spout port 850.

FIG. 17 provides a side view of the commercial French press coffee maker of the present invention, wherein an insulated decanter or airpot 900 is attached to lower assembly 200 by a connector mechanism 904 mounted on the lower assembly of coffee maker 100. FIG. 18 is a cross-sectional front view of airpot 900, which is connected to lower assembly 200 of coffee maker 100; and FIG. 19 is a front view of airpot 900 showing clip mechanism 902 mounted thereon which attaches corresponding clip/connector 904 on lower assembly 200 of coffee maker 100.

The various components of coffee maker 100 are manufactured using standard manufacturing techniques and include various common materials such as stainless steel (e.g., inner wall of brew chamber assembly 700); polycarbonate (e.g., outer wall of brew chamber assembly 700); rubber; metal; and plastic. Other suitable materials may also be used. With regard to using fully assembled coffee maker 100, lift assembly 300 is moved into its lowered positioned using lift knob assembly 323 and grounds chamber assembly 800 is removed from lift assembly 300 by sliding it outward. Grounds chamber 800 is cleaned (if necessary) and an appropriate amount of ground coffee is added to the basin of component 805. Grounds chamber assembly 800 is returned to lift assembly 300 in the proper position and lift assembly 300 is moved to its raised positioned (again using lift knob assembly 323) wherein seal ring 806 engages lower seal ring 716 on brew chamber assembly 700. An appropriate volume of heated water is added to brew chamber assembly 700 and mixed with ground coffee, which is then allowed to brew for a predetermined period of time.

Lid assembly 600 is then positioned on brew chamber assembly 700 and press handle 652 is depressed either manually or in some embodiments of this invention, in an automated manner. As press handle 652 is depressed the filter screen in frame 606 pushes the coffee grounds out of suspension in the heated water and back into the basin of component 805. As press handle 652 is depressed, both wiper seals 604 and 610 to act together to prevent the coffee grounds from bypassing the filter screen. After coffee has been dispensed from coffee maker 100, press release button 644 is depressed allowing the filter screen to remain on top of the spent coffee grounds and second wiper seal 610 to be pulled upward. As wiper seal 610 moves upward, it acts as a squeegee that cleans the edges of the brew chamber by removing oils and any remaining coffee grounds. Brewed coffee is dispensed from the brew chamber by way of a dispensing system that includes spout tube 846, which (in some embodiments) when not in use is positioned against the curved outer wall of basin 802. The curved geometry of spout tube 846 allows it to be wrapped around basin 802 to prevent damage to spout tube 846 when not in use. By pulling outward on handle 812, an internal valve system is opened (see FIG. 14) and brewed coffee flows out of basin 805. Releasing handle 812 causes the internal valve system to return to its closed position and coffee stops flowing from basin 802.

While the present invention has been illustrated by the description of exemplary embodiments thereof, and while the embodiments have been described in certain detail, there is no intention to restrict or in any way limit the scope of the appended claims to such detail. Additional advantages and modifications will readily appear to those skilled in the art. Therefore, the invention in its broader aspects is not limited to any of the specific details, representative devices and methods, and/or illustrative examples shown and described. Accordingly, departures may be made from such details without departing from the spirit or scope of the general inventive concept.

What is claimed:

1. A coffee brewing and dispensing system, comprising:
   (a) a removable grounds chamber assembly, wherein the removable grounds chamber assembly includes:
       (i) a basin for holding ground coffee;
       (ii) an extendable dispensing spout; and
       (iii) a valve mechanism for opening and closing the dispensing spout;
   (b) a brewing chamber assembly positioned on top of the removable grounds chamber assembly;
   (c) a plunger assembly adapted to be inserted into a brewing chamber and a removable grounds chamber, wherein the plunger assembly includes:
       (i) a press rod;
       ii) a main handle mounted on the press rod, wherein the main handle includes a trigger mounted therein;
       (iii) a lid mounted on the press rod below the handle;
       (iv) a wiper assembly mounted on the press rod below the lid; and
       (v) a filter assembly mounted on the press rod below the wiper assembly, wherein the wiper assembly is movable independent of the filter assembly by actuating the trigger in the handle; and
   (d) a supportive base plate, wherein the supportive base plate is adapted to support the removable grounds chamber assembly, the brewing chamber assembly, and the plunger assembly; and
   (e) a lifting mechanism attached to the supportive base plate, wherein the lifting mechanism includes a platform and a lever for moving the platform from a raised positioned to a lowered positioned and from the lowered position back to the raised position, thereby lowering and raising the removable grounds chamber assembly, the brewing chamber assembly, and the plunger assembly when the removable grounds chamber assembly positioned on top of the platform, wherein the main handle is in contact with a depressor handle for depressing the main handle when the removable grounds chamber assembly is at the raised position, and wherein the main handle is not in contact with the depressor handle when the removable grounds chamber assembly is at the lowered position.

2. The system of claim 1, further comprising a source of water connected to or integrated with the brewing chamber.

3. The system of claim 2, further comprising a water heating system that includes a water heater connected to or integrated with the source of water.

4. The system of claim 1, wherein the extendable dispensing spout includes a geometry that conforms to the geometry of the removable grounds chamber.

5. The system of claim 1, wherein the wiper assembly further includes a wiper seal mounted thereon, and wherein the wiper seal is adapted to contact an interior surface of the brewing chamber.

6. The system of claim 1, wherein the filter assembly further includes a wiper seal mounted thereon, and wherein the wiper seal is adapted to contact an interior surface of the brewing chamber.

7. The system of claim 1, wherein the plunger assembly is an automated component of the system.

8. A coffee brewing and dispensing system, comprising:
   (a) a supportive frame, wherein the supportive frame includes a base plate, two side supports mounted on the base plate and, a rear support mounted on the base plate;
   (b) a lifting mechanism attached to the base plate of the supportive frame, wherein the lifting mechanism includes a platform and a lever for moving the platform from a raised positioned to a lowered positioned and from the lowered position back to the raised position;
   (c) a removable grounds chamber assembly positioned on top of the platform such that the removable grounds chamber assembly is movable from a raised positioned to a lowered positioned and from the lowered position back to the raised position by the lifting mechanism, wherein the removable grounds chamber assembly includes:
       (i) a basin for holding ground coffee;
       (ii) an extendable dispensing spout; and
       (iii) a valve mechanism for opening and closing the dispensing spout;
   (d) a brewing chamber assembly positioned on top of the removable grounds chamber assembly and attached to the supportive frame; and
   (e) a plunger assembly adapted to be inserted into a brewing chamber and a removable grounds chamber, wherein the plunger assembly includes:
       (i) a press rod;
       (ii) a main handle mounted on the press rod, wherein the main handle includes a trigger mounted therein, wherein the main handle is in contact with a depressor handle for depressing the main handle when the removable grounds chamber assembly is at the raised position, and wherein the main handle is not in contact with the depressor handle when the removable grounds chamber assembly is at the lowered position;
       (iii) a lid mounted on the press rod below the handle;
       (iv) a wiper assembly mounted on the press rod below the lid; and
       (v) a filter assembly mounted on the press rod below the wiper assembly, wherein the wiper assembly is movable independent of the filter assembly by actuating the trigger in the handle.

9. The system of claim 8, further comprising a source of water connected to or integrated with the brewing chamber.

10. The system of claim 8, further comprising a water heating system that includes a water heater connected to or integrated with the source of water.

11. The system of claim 8, wherein the extendable dispensing spout includes a geometry that conforms to the geometry of the removable grounds chamber.

12. The system of claim 8, wherein the wiper assembly further includes a wiper seal mounted thereon, and wherein the wiper seal is adapted to contact an interior surface of the brewing chamber.

13. The system of claim 8, wherein the filter assembly further includes a wiper seal mounted thereon, and wherein the wiper seal is adapted to contact an interior surface of the brewing chamber.

14. A coffee brewing and dispensing system, comprising:
   (a) a supportive frame, wherein the supportive frame includes a base plate, two side supports mounted on the base plate and a rear support mounted on the base plate;
   (b) a lifting mechanism attached to the base plate of the supportive frame, wherein the lifting mechanism includes a platform and a lever for moving the platform from a raised positioned to a lowered positioned and from the lowered position back to the raised position;
   (c) a removable grounds chamber assembly positioned on top of the platform such that the removable grounds chamber assembly is moveable from a raised positioned to a lowered positioned and from the lowered position back to the raised position by the lifting mechanism, wherein the removable grounds chamber assembly includes:
      (i) a basin for holding ground coffee;
      (ii) an extendable dispensing spout; and
      (iii) a valve mechanism for opening and closing the dispensing spout;
   (d) a brewing chamber assembly positioned on top of the removable grounds chamber assembly and attached to the supportive frame;
   (e) a plunger assembly adapted to be inserted into a brewing chamber and a removable grounds chamber, wherein the plunger assembly includes:
      (i) a press rod;
      (ii) a main handle mounted on the press rod, wherein the main handle includes a trigger mounted therein, wherein the main handle is in contact with a depressor handle for depressing the main handle when the removable grounds chamber assembly is at the raised position, and wherein the main handle is not in contact with the depressor handle when the removable grounds chamber assembly is at the lowered position;
      (iii) a lid mounted on the press rod below the handle;
      (iv) a wiper assembly mounted on the press rod below the lid; and
      (v) a filter assembly mounted on the press rod below the wiper assembly, wherein the wiper assembly is movable independent of the filter assembly by actuating the trigger in the handle; and
   (f) a source of water connected to or integrated with the brewing chamber; and
   (g) a rapid water heating system that includes a water heater connected to or integrated with the source of water.

15. The system of claim 14, wherein the wiper assembly further includes a wiper seal mounted thereon that is adapted to contact an interior surface of the brewing chamber, and wherein the filter assembly further includes a wiper seal mounted thereon that is adapted to contact an interior surface of the brewing chamber.

* * * * *